April 13, 1954   C. T. POMMERENING   2,675,140
WALL BOX
Filed Jan. 7, 1949   2 Sheets-Sheet 1
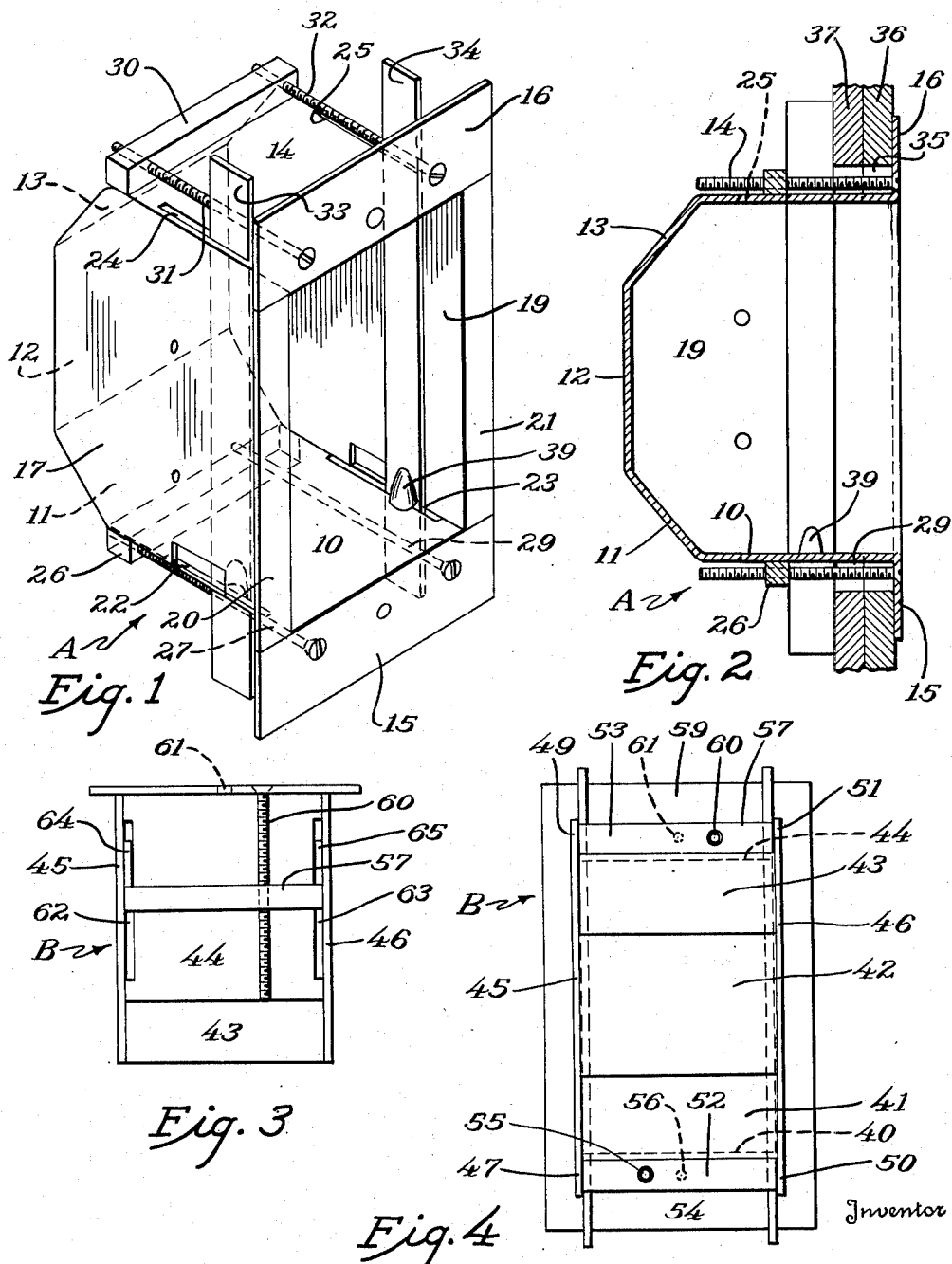
Inventor
Clarence T. Pommerening
By Robert M. Dunning

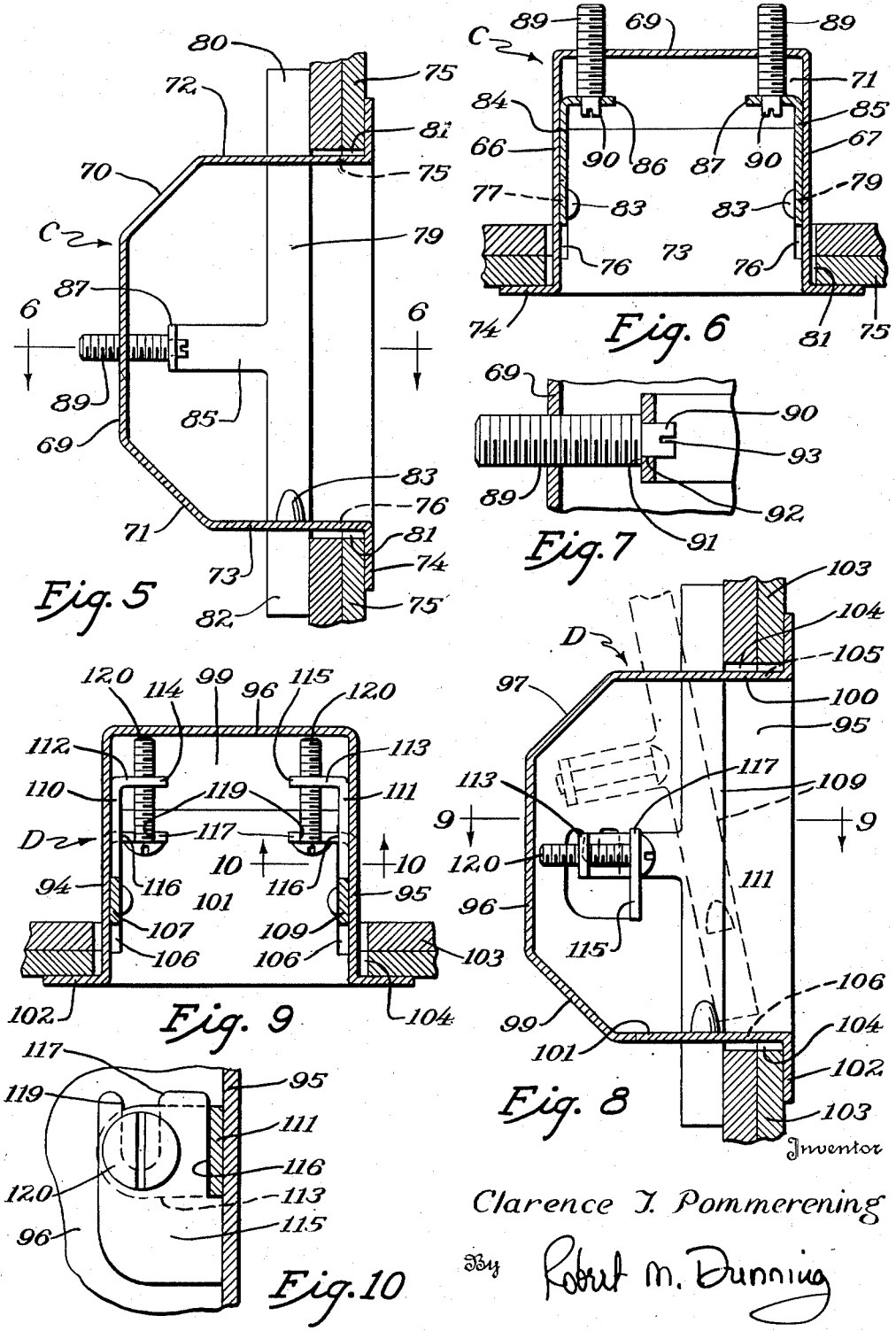

Patented Apr. 13, 1954

2,675,140

UNITED STATES PATENT OFFICE 2,675,140

WALL BOX

Clarence T. Pommerening, Long Prairie, Minn.

Application January 7, 1949, Serial No. 69,710

11 Claims. (Cl. 220—3.6)

My invention relates to an improvement in wall box of a type used for supporting an electrical switch, socket, plug, receptacle or the like.

Wall boxes are usually inserted through an aperture in the wall and are anchored to the material forming the wall base. For example if the wall is a plastered wall the boxes are usually secured to the lathe or plaster support while the face plate covering the hole overlies the surface of the plaster about the hole. As a result a gap is provided between the edge of the wall box and the face plate, which is objectionable from a fire hazard standpoint and also objectionable in that the hole for the wall box in the plaster must usually be somewhat larger than the hole through the backing member on which the plaster is supported.

It is the object of the present invention to provide a wall box which may be inserted through an aperture of uniform size extending through both the plaster and the backing material and which may be mounted in place without the necessity of anchoring the wall box flanges to the backing behind the plaster. Some difficulty is experienced in inserting screws into the plaster backing so that they will remain securely in place. My wall box does not require the use of anchoring screws and bolts extending into the wall and therefore greatly simplifies the task of mounting the wall box.

A feature of the present invention lies in the provision of a wall box comprising a receptacle of any suitable shape having a flange extending partially or entirely about the open front side thereof. This receptacle is provided with one or more pairs of aligned slots therein at a point spaced from the peripheral flanges. These aligned slots are designed to accommodate clamping bars or rods which extend above and below the receptacle on the rear side of the wall. Clamping means are provided to draw these clamping bars against the rear surface of the wall, thus holding the wall box from disengagement with the wall.

A feature of the present invention lies in the provision of a terminal box having at least one pair of aligned slots therethrough and having a clamping bar which extends through the slots for engagement with the rear surface of the wall opposite the surface engaged by the peripheral flange of the wall box. The clamping rod is inserted in place after the wall box has been inserted through an opening in the wall and the ends of the rod are arranged to engage the concealed surface of the wall on opposite sides of the wall opening for the wall box. Clamping means are provided for drawing the clamping bar against the concealed wall surface so as to clamp the wall between the clamping bar and the wall box flange.

A feature of the present invention lies in the provision of a wall box having a pair of clamping members provided with means for drawing the clamping members toward the peripheral flange of the wall box. When the wall box is in place a clamping bar is inserted through the wall box to bridge the wall box opening and the clamping means engage the bar and draw the same against the concealed wall surface.

An added feature of the present invention lies in the fact that in preferred form my wall box includes a clamping element movable along opposite sides of the wall box toward or away from the peripheral flange of the wall box and in providing one or more clamping bolts for moving this clamping element. One or more clamping bars extend through opposite sides of the wall box and bridge the opening in which the wall box is inserted by tightening the clamping bolts. The clamping elements are moved against opposite ends of the clamping bar or bars to draw the same against the concealed wall surface.

These and other objects and novel features of my invention will be more clearly and fully set forth in the following specification and claims.

In the drawings forming a part of my specification:

Figure 1 is a perspective view of a wall box showing my new construction.

Figure 2 is a sectional view through the wall box showing the construction thereof.

Figure 3 is a top plan view of a modified form of wall box construction.

Figure 4 is a rear elevational view of the wall box illustrated in Figure 3.

Figure 5 is a cross sectional view vertically through a modified form of wall box.

Figure 6 is a sectional view of the wall box structure illustrated in Figure 5, the position of the section being indicated by the line 6—6 of Figure 5.

Figure 7 is a sectional view through a detail portion of the construction shown in Figures 5 and 6.

Figure 8 is a vertical sectional view through a modified form of construction of the device shown in Figure 5.

Figure 9 is a sectional view through the wall box illustrated in Figure 8, the position of the section being indicated by the line 9—9 of Figure 8.

Figure 10 is a sectional view through a detail portion of the wall box illustrated in Figures 8 and 9 of the drawings.

The wall box A illustrated in Figures 1 and 2 of the drawings may be of any suitable outline shape. As illustrated in Figures 1 and 2 the wall box includes a bottom panel 10 which is connected by an upwardly and rearwardly inclined panel 11 to a rear wall panel 12. The panel 12 is connected by an upwardly and forwardly inclined panel 13 to a top panel 14. Coplanar flanges 15 and 16 are provided on the bottom panel 10 and top panel 14 respectively. The wall box A includes a pair of spaced side wall panels 17 and 19 marginally connecting the various panels previously described. The side walls 17 and 19 are provided with coplanar flanges 20 and 21 which abut against lateral extensions on the flanges 15 and 16 so as to provide a peripheral flange entirely encircling the open front end of the box. The box is thus described as though it were formed of three separate pieces welded or otherwise connected together. However, the specific manner in which the walls are connected together is not important in the present invention as this is merely a matter of choice.

The bottom panel 10 is provided with two parallel spaced slots 22 and 23 arranged just inwardly of the side walls 17 and 19. The top panel 14 is provided with a similar pair of spaced slots 24 and 25 which extend through the top panel just inwardly of the side walls 17 and 19 and aligned with the slots 22 and 23 respectively.

A bar 26 or other similar element is designed to slide along the undersurface of the bottom panel 10 toward or away from the flange 15. A pair of spaced parallel bolts or screws 27 and 29 extend through the flange 15 and through the clamping bar 26. The bolts or screws 27 and 29 are preferably of the flat head type and the heads are countersunk into the flange 15 so as to be substantially flush with the outer surface thereof. The heads of the bolts or screws 27 and 29 rotate freely in the flange 15 but are threaded into the clamping bar 26 so that rotation of these bolts moves the clamping bar 26 toward or away from the flange 15.

A similar clamping structure is provided at the upper end of the wall box. A clamping bar 30 is slidable along the upper surface of the top panel 14 toward or away from the flange 16. A pair of parallel bolts or screws 31 and 32 extend through the flange 16 and are threaded into the clamping bar 30. The heads of the bolts 31 and 32 are preferably flat and are recessed into the flange 16 to be substantially flush therewith. Rotation of the clamping screws 31 and 32 moves the bar 30 toward or away from the flange 16.

A pair of clamping bars 33 and 34 are designed to hold the wall box A in place. These clamping bars extend through the aligned slots in the opposed panels 10 and 14 and bridge the opening in the wall in which the wall box is inserted. The clamping bars 33 and 34 are drawn against the rear or concealed side of the wall by means of the clamping bars 26 and 30.

The manner in which the wall box A is mounted in the wall is believed clearly understandable from the foregoing description. An opening is cut in the wall which is of proper size to admit the wall box body and the clamping bars 26 and 30 located outwardly thereof. The wall opening 35 extends both through the plaster covering 36 and the plaster backing 37 on which the plaster has been applied. Obviously the opening 35 may be in a solid wall of wood or any other material where such walls are employed.

When the opening 35 has been formed the wall box A is inserted therethrough before the clamping strips 33 and 34 are inserted through the various bars or slots. When the wall box A is in place the strips 33 and 34 are put into place the upper end of each strip being inserted through its respective slot 24 or 25 and the strip or bar being inserted a distance sufficient so that the lower end of the strip may be moved into the box. The lower end of each strip is then inserted through its respective slot 22 or 23 and allowed to drop a distance sufficient to cause the clamping strip or bar to bridge the opening 35 and to extend a substantial distance above and below the same. For convenience in holding the bars 33 and 34 in place I provide an inwardly bulged portion 39 on each strip which forms a shoulder engageable with the bottom panel 10 when the clamping bars are approximately centered with respect to the body of the wall box.

In order to clamp the wall box in place it is then only necessary to rotate the clamping bolts or screws 31 and 32 at the top of the wall box and the clamping bolts or screws 27 and 29 at the lower end of the wall box until the clamping bars 26 and 30 engage against the rear edges of the clamping bars 33 and 34 to pull the bars against the inner or concealed surface of the wall. This operation may be accomplished by means of a speed screw driver or similar tool which quickly rotates the bolts or screws to draw the clamping bars 26 and 30 into clamped position. At the time the wall box is inserted through the opening 35 the clamping bars 26 and 30 are positioned rearwardly of the ends of the various slots 22, 23, 24, and 25.

In Figures 3 and 4 of the drawings I disclose a wall box B which is virtually identical with the wall box A except for the fact that only one clamping bolt or screw is employed on each end of the wall box in place of two. The bottom wall 40, the rearwardly and upwardly inclined wall 41, the rear wall 42, the forwardly and upwardly inclined wall 43, and the top wall or panel 44 correspond with the wall panels 10, 11, 12, 13, and 14 of the wall box A. The side wall panels 45 and 46 are similar to the side wall panels 17 and 19 with the exception of the fact that these side walls usually project slightly above the bottom and top panels 40 and 44. It will be noted that the side wall panel 45 is provided with projecting ends 47 and 49 which extend below and above the bottom and top panels 40 and 44. The wall panel 46 is similarly provided with projecting ends 50 and 51 which extend below and above the bottom and top panels 40 and 44. These projecting side wall ends act as a guide for the clamping bars 52 and 53 which correspond to the clamping bars 26 and 30.

The clamping bar 52 slides beneath the bottom panel 40 between the flanges 47 and 50 and is moved toward or away from the lower flange 54 by a clamping bolt or screw 55. This clamping bolt or screw 55 is off-set slightly from the center of the clamping bar so that the threaded opening 56 in the flange 54 ordinarily used for attaching a switch or other electrical device in the wall box may be centrally mounted. The clamping bar 57 is slidable along the top panel 44 between the flanges 45 and 46 and is moved toward or away from the top flange 59 by a clamping screw or bolt 60. This clamping bolt or screw 60 is off-set from the longitudinal center of the clamping bar 57 so that the threaded aperture 61 in the top flange 59 may be used for centrally mounting a piece of electrical equipment in the wall box.

The top and bottom panels 40 and 44 are provided with parallel aligned slots 62 and 63 for accommodation of the clamping strips 64 and 65. The clamping strips 64 and 65 are identical to the clamping strips 33 and 34 previously described and operate in a similar manner. This construction is thus virtually identical with the construction previously described with the exception of the fact that the clamping bars are moved toward or away from the inner wall surface by means of a single screw or bolt in place of two spaced clamping screws or bolts.

It will be seen that my wall box may be easily mounted in a wall opening and may be anchored to the marginal edges of the wall encircling the opening by the clamping strips. Thus the anchoring of the wall box is not dependent upon the use of screws or bolts extending into the body of the wall. Furthermore, my wall box extends to the surface of the wall and thereby supports a switch or other electrical element enclosed in a metal housing and no part of the encircling wall is exposed to the interior of the wall box. Thus much of the danger of fire is eliminated with my construction and a tighter and neater enclosure for the electrical connections is produced.

In Figures 5, 6, and 7 of the drawings I disclose a wall box C which is similar in most respects to the wall boxes A and B previously described. The wall box C comprises a pair of parallel side walls 66 and 67 connected by a rear wall 69. The rear wall 69 is connected by angularly extending wall portions 70 and 71 to a top wall 72 and a bottom wall 73. A rectangularly shaped peripheral flange 74 encircles the open front end of the wall box and is designed to lie flat against the outer surface of a wall 75. The top panel 72 and the bottom panel 73 are provided with slots 75 and 76 therein similar to the slots 22, 23, 24, and 25 previously described. A pair of clamping bars 77 and 79 are designed to extend through the slots 75 and 76 so that the upper end 80 thereof lies inwardly of the outer surface of the wall 75 above the wall box aperture 81 therein, while the lower end 82 of each clamping bar lies inwardly of the inner surface of the wall 75 below the wall box aperture 81. The bars 77 and 79 are threaded through the slots 75 and 76 in the manner previously described and a projection 83 on each of the clamping bars prevents the clamping bar from dropping through the bottom slot 76.

Each of the arms 77 and 79 is provided with a rearward extension indicated by the numerals 84 and 85. These extensions extend toward the rear panel 69 of the wall box and terminate in right angularly extending flanges 86 and 87 which lie substantially parallel to the rear panel 69 of the wall box.

The rear wall 69 is provided with threaded apertures for accommodating adjusting screws or bolts 89. These adjusting screws 89 are provided with a reduced diameter forward end 90 which provides a shoulder 91 near the forward end. The reduced diameter end 90 extends through an aperture such as 92 in either the flange 86 or the flange 87. The reduced diameter end 90 is provided with a screw driver slot 93 by means of which the adjusting screw 89 may be rotated to force the shoulder 91 against the flange 86 or 87.

It will be seen that the adjusting screws 89 and 90 may be threaded into the rear wall 69 of the wall box so that only the reduced diameter end 90 projects forwardly from this wall. The clamping bars 77 and 79 may be inserted in place when the wall box C is in place in its wall aperture 81. The clamping bars 77 and 79 may be inserted in place when the wall box C is in place in its wall aperture 81. The clamping bars 77 and 79 may be moved rearwardly until the apertures 92 in the flanges 86 and 87 encircle the reduced diameter screw ends 90. By rotating the screws 89 by means of a screw driver or similar instrument the screws may be drawn forwardly, the shoulders 91 engaging against the flanges 86 and 87 to urge the clamping bars 77 and 79 against the inner surface of the wall above and below the aperture 81, thus firmly clamping the wall box C in place.

A modification of this construction is illustrated in Figures 8, 9, and 10 of the drawings. This construction is designated by the letter D and includes a wall box body having substantially parallel side walls 94 and 95 and a rear panel 96 connecting the same. The rear panel 96 is connected by diagonally extending panels 97 and 99 to the top panels 100 and 101 respectively. A marginal flange 102 extends about the periphery of the open front end of the wall box to lie flush against the outer surface of the wall 103, the box being positioned in the wall aperture 104.

Slots 105 and 106 similar to the slots previously described are provided in the upper and lower panels 100 and 101, respectively. Clamping bars 107 and 109 are provided for holding the wall box in place. The clamping bars 107 and 109 are virtually identical to the previously described clamping bars 77 and 79 and are formed in a similar manner for mounting in the wall box in a similar manner.

The clamping bars 107 and 109 are provided with rearwardly extending arms or projections 110 and 111 which terminate in right angularly extending flanges 112 and 113 which are substantially parallel to the rear panels 96. Substantially L-shaped ears 114 and 115 are punched from the side walls 94 and 95 and are bent inwardly to extend at right angles to the side walls and parallel to the rear wall 96. These ears are shaped to extend inwardly from their respective side walls and to then extend upwardly to provide a groove or notch 116 between the upwardly extending end 117 of each ear and its respective side wall. The upwardly extending ends 117 of the ears 115 are notched as indicated at 119, the notch preferably communicating with the upper end of the ear.

Bolts 120 are designed to extend through each notch 119 and to extend through a threaded aperture in the corresponding flange 112 or 113. By rotating the bolts 120 in the proper direction the flanges 112 and 113 may be drawn toward the ears 115, thereby urging the upwardly and downwardly projecting ends of the clamping bars 107 and 109 against the inner surface of the wall to hold the wall box fixed.

In accordance with the patent statutes, I have described the principles of construction and operation of my wall box and while I have endeavored to set forth the best embodiment thereof, I desire to have it understood that obvious changes may be made within the scope of the following claims without departing from the spirit of my invention.

I claim:

1. A wall receptacle comprising a hollow enclosure designed to fit in an aperture in a wall and having flange means arranged to overlie a portion of the exterior surface of the wall, a rigid clamping bar extending through opposite sides of said receptacle and to bridge the aperture inwardly of the wall, and threaded means for drawing said clamping bar against the inner wall surface.

2. A wall box including a hollow receptacle designed to extend through an aperture in a wall and having flange means designed to overlie a portion of the exterior surface of the wall, a pair of rigid spaced clamping bars extending across said receptacle and through opposite sides thereof, said bars designed to bridge the aperture in the wall, and threaded means for drawing said bars against the inner wall surface.

3. A wall box comprising a hollow enclosure designed for insertion through the wall aperture and including means designed to engage a portion of the exterior wall surface, said enclosure having two pairs of aligned slots in opposite walls thereof, clamping bars designed for accommodation in said slots and designed to bridge the wall aperture, and means for drawing said clamping bars against the inner wall surface, said means including a pair of clamping members movably supported by said receptacle for movement toward and away from said means designed to overlie portions of the outer wall surface, and means connecting said receptacle and said clamping members for moving said clamping members against said clamping bars.

4. The structure described in claim 3 in which the last named connecting means comprises a threaded bolt.

5. The structure described in claim 3 in which the last named connecting means comprises a pair of spaced threaded bolts.

6. A wall box designed for mounting in a wall aperture, the box including a hollow enclosure arranged to extend through the wall aperture, means on said enclosure arranged to hold the enclosure from inward movement, a rigid clamping member extending through said enclosure and engageable with portions of the inner wall surface on opposite sides of the enclosure and extending into spaced parallel relation to the rear wall of the enclosure, and means for forcing said clamping member away from the rear end of the enclosure to clamp the clamping member against the rear surface of the wall.

7. A wall box designed for insertion through a wall aperture and including a hollow enclosure having an open front side, clamping member extending through said enclosure and engageable against the inner surface of the wall on opposite sides of the aperture, means on said enclosure engageable with the outer surface of the wall, an arm on said clamping member having an angularly extending end extending substantially parallel to the side of the enclosure opposite the front open side, and a threaded member between said angularly extending arm end and said opposite side of said enclosure to urge said arm away from said opposite side and to urge the clamping member against the inner wall surface.

8. The structure described in claim 7 and including two similar clamping members extending through said enclosure in spaced substantially parallel relation.

9. A wall box for use in an aperture in a wall including an enclosure having an opening in one side thereof, said enclosure being adapted for reception in said wall aperture, means for limiting the inward movement of said enclosure into said aperture, and means for holding said wall box from reverse movement out of said aperture, said means including a clamping member extending through said enclosure and engageable with said wall, an arm on said clamping member having an angularly extending extremity, means projecting inwardly from a wall of said receptacle into substantially parallel relation to said angularly extending extremity, said projecting means being partially spaced from the wall from which it projects to provide a slot between the projecting means and the wall through which said arm extends, and means for drawing said off-set arm extremity toward said inwardly projecting means to move said clamping member toward said one side of said hollow enclosure.

10. A wall box including a hollow receptacle designed to extend through an aperture in a wall and having flange means designed to overlie a portion of the exterior surface of the wall, a pair of spaced clamping bars extending across said receptacle and through opposite sides thereof, a clamping bar extending transversely of the first named clamping bars, and means for drawing said last named clamping bar against the first named clamping bars.

11. A wall receptacle comprising a hollow enclosure designed to fit in an aperture in a wall and having flange means arranged to overlie a portion of the exterior surface of the wall, the receptacle having vertically aligned slots in opposite sides thereof, a rigid clamping bar adapted to extend through said slots and to bridge the aperture inwardly of the wall, means projecting from one side of said bar at a situs spaced from one end thereof to permit insertion of the ends of said bar into said slots from within said receptacle and to thereafter afford support for said bar, and means for drawing said clamping bar against the inner wall surface.

References Cited in the file of this patent

UNITED STATES PATENTS

| Number | Name | Date |
|---|---|---|
| 916,436 | Greenfield | Mar. 30, 1909 |
| 1,265,744 | Canfield | May 14, 1918 |
| 1,276,378 | Kruse | Aug. 20, 1918 |
| 1,339,340 | Holland et al. | May 4, 1920 |
| 1,601,291 | Burkhard | Sept. 28, 1926 |
| 1,662,422 | Hodges | Mar. 13, 1928 |
| 1,726,495 | King | Sept. 27, 1929 |
| 1,775,058 | Wever | Sept. 2, 1930 |
| 1,779,681 | Smith et al. | Oct. 28, 1930 |
| 1,791,311 | Hamblen | Feb. 3, 1931 |
| 1,816,584 | Hussar | July 28, 1931 |
| 1,820,309 | Judd et al. | Aug. 25, 1931 |
| 1,893,357 | Carson | Jan. 3, 1933 |
| 2,126,114 | Jett | Aug. 9, 1938 |
| 2,143,278 | Myers | Jan. 10, 1939 |
| 2,223,273 | Slessman | Nov. 26, 1940 |
| 2,233,731 | Budnick | Mar. 4, 1941 |
| 2,244,977 | Hansman et al. | June 10, 1941 |
| 2,272,846 | Lindstrom | Feb. 10, 1942 |
| 2,286,898 | Cover | June 16, 1942 |
| 2,299,696 | Gregessen | Oct. 20, 1942 |
| 2,357,787 | Windsheimer | Sept. 5, 1944 |
| 2,374,993 | Haynes | May 1, 1945 |

FOREIGN PATENTS

| Number | Country | Date |
|---|---|---|
| 512,686 | Great Britain | Sept. 22, 1939 |